United States Patent [19]

Hashimoto

[11] Patent Number: 5,609,079
[45] Date of Patent: Mar. 11, 1997

[54] SOCKET MECHANISM HAVING FLEXIBLE COUPLING THEREIN USED WITH VERTICAL TYPE POWERED BOLT/NUT DRIVING APPARATUS

[75] Inventor: Ryoichi Hashimoto, Iwaki, Japan

[73] Assignee: K.K. Joban Engineering, Iwaki, Japan

[21] Appl. No.: 614,640

[22] Filed: Mar. 13, 1996

[30] Foreign Application Priority Data

Mar. 14, 1995 [JP] Japan ................................. 7-054751

[51] Int. Cl.$^6$ .................................................. B25B 23/16
[52] U.S. Cl. ................................................... 81/177.75
[58] Field of Search ........................... 81/177.75, 121.1, 81/119, 121, 122, 150, 152, 157; 403/145

[56] References Cited

U.S. PATENT DOCUMENTS

| | | | |
|---|---|---|---|
| 2,777,353 | 1/1957 | Willis | 81/121.1 |
| 3,590,235 | 6/1971 | Leo et al. | 81/121.1 |
| 3,855,884 | 12/1974 | McPeak | 81/177.75 |
| 3,897,703 | 8/1975 | Phipps | 81/177.75 |
| 4,936,701 | 6/1990 | Allen et al. | 81/177.75 |
| 4,941,862 | 7/1990 | Hazebrook et al. | 81/177.75 |
| 4,984,942 | 1/1991 | Holtz | 81/177.75 |
| 5,409,320 | 4/1995 | Maury et al. | 403/122 |

Primary Examiner—D. S. Meislin
Assistant Examiner—Joni B. Danganan
Attorney, Agent, or Firm—Kenjiro Hidaka

[57] ABSTRACT

There is provided a socket mechanism for rotating a bolt or nut, or like fastening piece, that is used with a vertical type powered bolt/nut driving apparatus. The socket mechanism has a spindle that can be coupled to a drive shaft of the driving apparatus, a socket for engaging with the bolt or nut having a guide at the bottom end thereof for facilitating the object bolt or nut to slip into the socket, a socket holding core having a downwardly tapered mid section, and a generally cylindrically-shaped core holder fixedly attached to the spindle having a bottom opening. The socket is fixedly attached to the low end of the socket holding core. The tapered part of the socket holding core freely lies on the rim of the bottom opening of the core holder in a manner that a lower part of the core and the socket are below the opening and suspending from the core holder. The socket holding core and the spindle are flexibly coupled to each other so that a rotational power is transmitted from the spindle to the core but permitting lateral and angular misalignment therebetween, whereby a reasonable amount of lateral misalignment between the object fastening piece and the drive shaft of the driving apparatus is permitted.

4 Claims, 5 Drawing Sheets

5,609,079

SOCKET MECHANISM HAVING FLEXIBLE COUPLING THEREIN USED WITH VERTICAL TYPE POWERED BOLT/NUT DRIVING APPARATUS

BACKGROUND OF THE INVENTION

1. Field of the Invention

The invention pertains to a socket mechanism having a flexible coupling therein for driving a bolt or nut, or like fastening piece, that is used particularly with a vertical type powered bolt/nut driving apparatus. The socket mechanism is so constructed that a reasonable amount of lateral misalignment between the object bolt or nut and the drive shaft of the driving apparatus can be permitted.

2. Description of the Prior Art

A powered bolt/nut driving apparatus is used with a work piece, such as a socket, that engages with a bolthead of a bolt or a nut that is rotated by the apparatus.

However, the center axis, or the rotating axis, of the socket, or other type of work piece actually used, and the center axis of the object fastening piece which the socket engages with (i.e. the bolthead or nut) are often laterally misaligned with each other. The presence of such misalignment is rather common, and, therefore, various ideas have been introduced for coping with such problems.

FIG. 5 perspectively shows a part of a conventional generally cylindrically-shaped flexible-coupling type socket 50 and a part of a bolt 51 that is to be rotated with the socket 50. FIG. 6 is a diagrammatic under view particularly showing relative positions of the socket 50 and the bolt 51 that are laterally misaligned with each other. The socket 50 integrally has a pair of downwardly projecting lugs 50j on diametrically opposing sides of a bottom end 50b thereof. The bolt 51 integrally has a bolthead 51h with a pair of wings 51w extending toward diametrically opposite directions. The inside diameter of the socket 50 is substantially greater than the diameter of the bolthead 51h but is smaller than the total tip-to-tip length of the wings 51w. Characters "Cs" and "Cb" in FIG. 6 denote diametric centers of the socket 50 and the bolthead 51h, respectively.

In FIG. 6, the socket 50 and the bolt 51 are horizontally off-centered from each other by dimension δ, and the bolthead 51h is in contact with the inside wall surface and one of the lugs 50j of the socket 50. The dimension δ is the maximum limit of allowable misalignment within which the socket 50 can engage with the bolt 51. The allowable limit (δ) of the misalignment is a difference between the radii of the internal diameter of the socket 50 and the diameter of the bolthead 51h, as shown in FIG. 6. The socket 50 can engage with and rotate the bolt 51 overcoming a center misalignment therebetween as long as the internal diameter of the socket 50 is sufficiently larger than the diameter of the bolthead 51h and the tip-to-tip length of the lugs 50j is greater than the internal diameter of the socket 50. Needless to say, the socket 50 with lugs 50j, as shown in FIG. 5, will also be able to rotate a wing-nut similar to the bolthead 51h with wings 51w shown in FIG. 5.

(Problem to be Solved by the Present Invention)

Bolts with wing-heads, wing-nuts and sockets therefor having lugs are, however, less popular and not readily and economically available for a variety of applications. A particular application may require a special combination of bolthead (or nut) and socket having special shapes and dimensions that may not be readily available in the market. Conventional flexible-coupling type bolt (or nut) driving sockets tend to have disadvantages in availability and economy.

On the other hand, the bolts having hex boltheads and hex nuts are most commonly and widely used in the industries. They are readily available in various types, sizes and materials at comparatively low costs. However, virtually no center misalignment is allowed between a conventional socket designed for driving a bolt having hex bolthead or a hex nut before the socket engages with the nut or bolthead. Nevertheless, it is not an easy task to position a drive shaft of a vertical type powered driving apparatus without any lateral misalignment with the object bolt or nut.

SUMMARY OF THE INVENTION

In view of the above mentioned situation, the object of the present invention is to provide a socket mechanism employing a flexible coupling therein for driving most commonly available and widely used bolts and nuts that can be used with a conventional vertical type powered nut/bolt driving apparatus.

In order to achieve such object, the socket mechanism of the present invention has a spindle, a core holder, a socket holding core, and a socket. The spindle can be removably connected to a vertical drive shaft of the driving apparatus so as to be vertically moved and rotated by the driving apparatus, and has at least one downwardly projecting lug in a bottom end thereof. The core holder is generally cylindrically-shaped and is fixedly and coaxially connected to the spindle so that the core holder is rotated as the spindle is rotated. The core holder has a circular bottom opening having a chamfered rim whose geometric center is in a common rotating axis of the spindle and the core holder. The socket holding core has a downwardly tapered mid section and the entire socket holding core is freely lying on the rim of the bottom opening of the core holder in the downwardly tapered mid section thereof in a manner that a top part of the core is above the bottom opening and within the core holder and a bottom part of the core is below the opening suspending from the core holder, and the core is tiltable with respect to the core holder and the spindle. The core has at least one upwardly projecting ridge in the top part thereof so that when the spindle is rotated the downwardly projecting lug thereof engages with the upwardly projecting ridge of the core, whereby rotating power is transmitted from the spindle to the core. The socket is fixedly connected to the bottom part of the socket holding core coaxially therewith and is adapted for engaging with a bolt, nut or other type of object fastening piece to be rotated. The socket has a guide ring in a bottom thereof having a downwardly widening slant inside guide surface for guiding the object fastening piece thereinto.

DETAILED DESCRIPTION OF THE PREFERRED EMBODIMENT

Now, a preferred embodiment of a socket mechanism according to the present invention will be described in detail in reference to the drawings.

Figure 1:
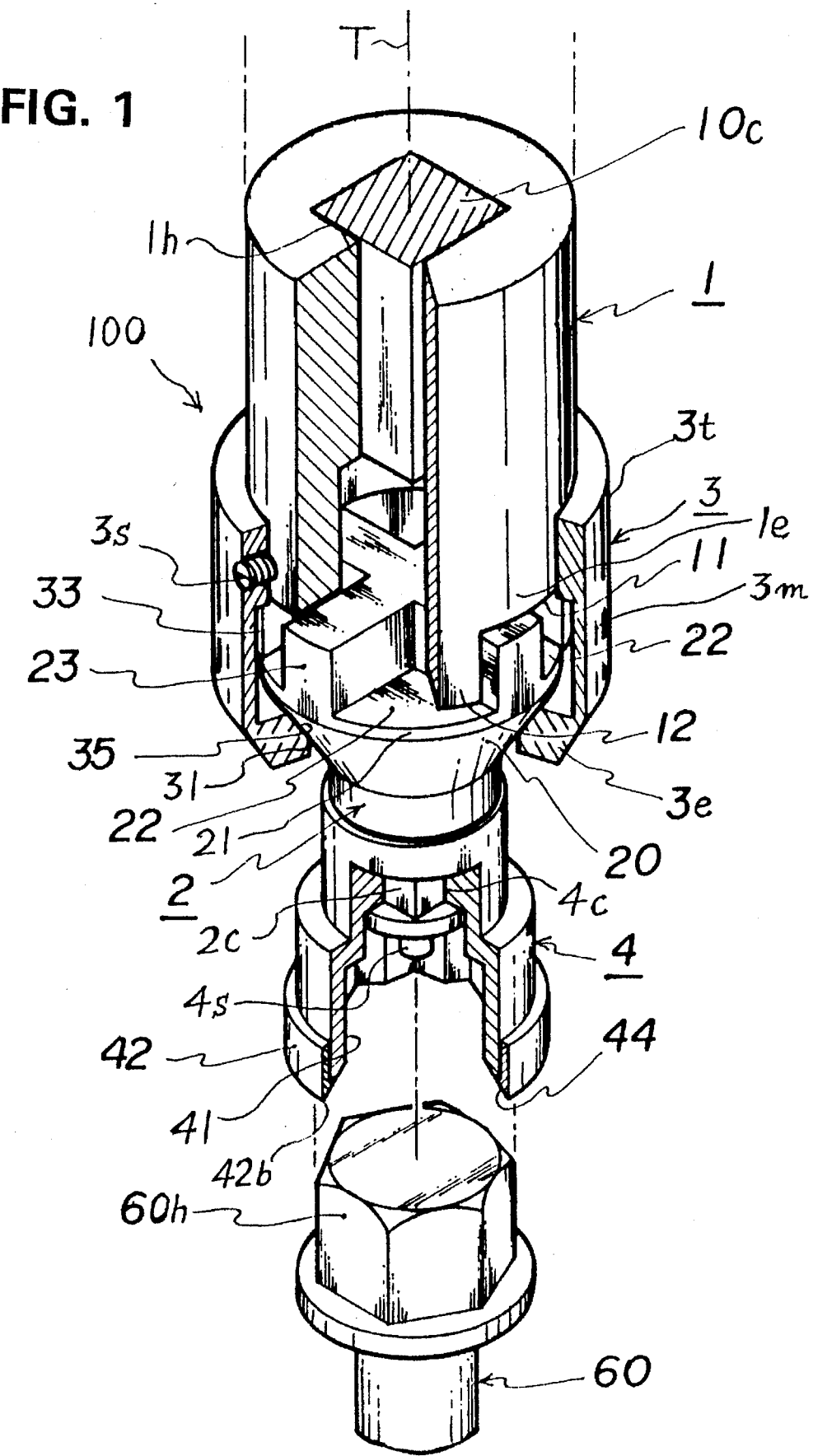
FIG. 1 ia a partially cut-off perspective view of a socket mechanism according to the present invention together with a part of a powered nut/bolt driving apparatus that rotates the socket mechanism and a part of a bolt to be rotated by the socket mechanism.
Figure 2:
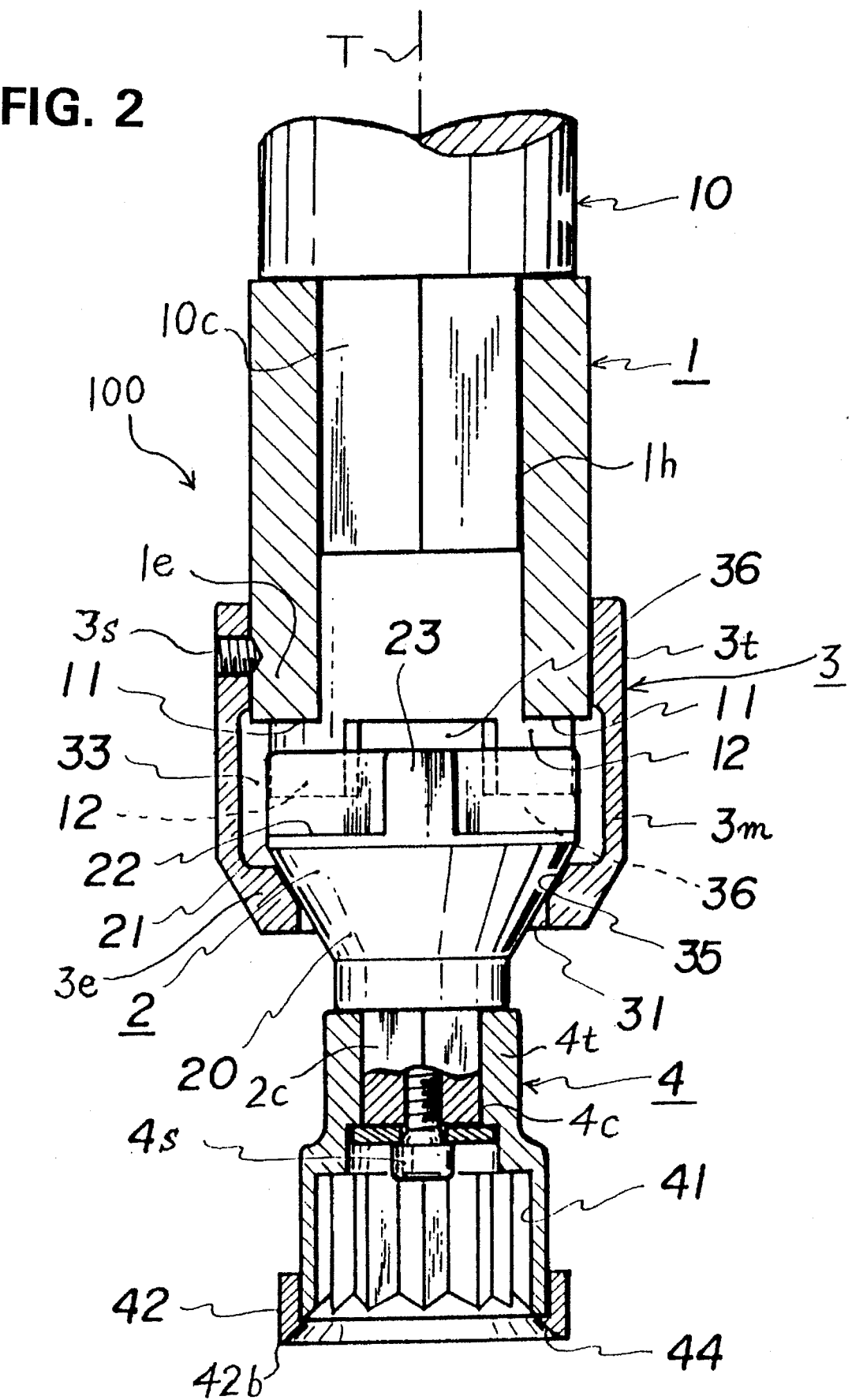
FIG. 2 is an elevational sectional view of the socket mechanism shown in FIG. 1 and a part of the nut/bolt driving apparatus that rotates the socket mechanism.

Referring to FIGS. 1 and 2, a socket mechanism 100 according to the present invention is coupled to a square coupling shaft 10c that is a low end part of a drive shaft 10 of a vertical type powered nut/bolt driving apparatus. The driving apparatus employs a driving device including one or more motors, power transmission gears or belts, etc. for not only rotating the drive shaft 10 but also moving the drive shaft 10 vertically up and down. However, since the driving apparatus is of a conventional type and well known, no details thereof are provided and only the low end part of the drive shaft 10 thereof is shown in FIGS. 1 and 2. Namely, the drive shaft 10 is a part of the prior known apparatus and is not a part of the socket mechanism 100 of the present invention. A conventional bolt 60 having a hex bolthead 60h shown in FIG. 1 is the object fastening piece that is driven with the socket mechanism 100. The object fastening piece may be a nut having a similar contour to that of the bolthead 60h.

The socket mechanism 100 consists mainly of a generally cylindrically-shaped coupler spindle 1, a socket holding core 2, a core holder 3, and a socket 4. The socket holding core 2 has a square coupling shaft 2c in a low end section thereof and the socket 4 has a square coupling hole 4c in a top section 4t thereof. The coupling shaft 2c is inserted to the coupling hole 4c so that the socket 4 is fixedly, but removably, attached to the core 2 coaxially therewith and secured thereto with a screw 4s. The core holder 3 is coaxially attached to a low section 1e of the spindle 1 and secured thereto with a setscrew 3s.

The coupler spindle 1 has a square inside coupling hole 1h in a top section thereof that accepts the square coupling shaft 10c of the drive shaft 10 so that the spindle 1 is removably coupled with the drive shaft 10.

The spindle 1 has four downwardly projecting lugs 12 integrally in a low end part 11 thereof that are disposed at about 90° angular interval about the common longitudinal center axis (i.e. the rotating axis) T of the spindle 1 and the core holder 3.

The socket holding core 2 has a comparatively thin mid part 21 and a downwardly tapered part 20 in a mid section thereof, immediately below the thin part 21, which has a truncated conical shape. The socket holding core 2 also integrally has, in a top section thereof, four upwardly projecting engaging ridges 23, each radially extending outwardly from the diametric center of the core 2, disposed at about 90° angular interval about the center of the core 2 so as to jointly form a cross-shaped upward projection. Between the four engaging ridges 23 are four sector-shaped recesses 22 that are also formed at about 90° angular interval about the diametric center of the core 2.

The core holder 3 is constructed so that the socket holding core 2 can make a vertical shifting, a horizontal shifting, and a tilting within respective predetermined limits, and yet, the rotational power can be transmitted from the spindle 1 to the core 2. The core holder 3 is generally cylindrically formed and has a low end part 3e that has a diametrically narrowed circular bottom opening 31 whose geometric center is in a common rotating axis T of the spindle 1 and the core holder 3. The bottom opening 31 has a rim 35 that is chamfered in a downwardly tapered manner so as to conform to the downwardly tapered part 20 of the socket holding core 2. The diameter of the bottom circular opening 31 of the core holder 3 is smaller than the diameter of a top part of the downwardly tapered part 20 of the core 2 but is greater than the diameter of a bottom part thereof.

A top section 3t of the core holder 3 has an internal diameter that is almost equal to but slightly larger than the outside diameter of the spindle 1, and the low section 1e of the spindle 1 is inserted to the top end part 3t of the core holder 2 so that the core holder is coaxially securely fixed to the spindle 1 by the setscrew 3s. The socket holding core 2 freely lies on the rim 35 of the bottom opening 31 of the core holder 3 in a manner that a middle part of the tapered part 20 of the core 2 makes contact with the chamfered rim 35 of the bottom opening 31 of the core holder 3. Therefore, an upper part of the core 2 is accommodated in the core holder 3 and a lower part thereof is disposed under the bottom opening 31. Thus, the core 2 is held by the core holder 3 in a suspending manner and kept from falling. A middle part 3m of the core holder 3 has a widened internal diameter and has a generally columnar space therein. Inside the middle part 3m of the core holder 3 are disposed the lugs 12 of the spindle 1, the cross-shaped engaging ridge 23, a top section of the tapered part 20 and the thin part 21 of the core 2.

The socket holding core 2 is disposed in a manner that the downwardly projecting and angularly spaced lugs 12 of the spindle 1 are in the equally angularly spaced recesses 22 of the core 2, so that when the spindle 1 is rotated the lugs 12 of the spindle 1 will engage with the engaging ridges 23 of the core 2, whereby the rotating power will transmit from the spindle 1 to the core 2. Vertical gaps 36 (FIG. 2) are present between each of the lugs 12 and the core 2 and between each of the engaging ridges 23 and the low end 11 of the spindle 1, and these vertical gaps 36 provide the core 2 a vertical play. On the other hand, horizontal gaps 33 (FIG. 2) are present between the middle part 3m of the core holder 3 and the core 2, and these horizontal gaps provide the core 2 a horizontal play in the core holder 3.

The socket 4 is fixedly attached to the socket holding core 2 in a manner that a top section 4t of the socket 4 is outserted to the square coupling shaft 2c of the core 2 and secured thereto by the screw 4s. In the present embodiment, the socket 4 is a top-closed bottom-open box-like socket that is adapted for engaging with the hex bolthead 60h of the bolt 60, as shown in FIG. 1, or a hex nut having a similar contour to that of the hex bolthead 60h.

The socket 4 has a bolthead/nut engaging section 41 in a lower part thereof and a guide ring 42 at a low end thereof. The guide ring 42 has an inside slant guide surface 44 with downwardly increasing diameters having bottom end rim 42b for guiding the bolthead 60h (or nut) into the socket 4. The guide surface 44 is disposed below the nut engaging section 41.

The shape of the socket 4 is not limited to that as illustrated in the figures, but any kind of practical socket or tool piece that engages with a bolthead, screwhead or nut may be properly selected so as to most fit the object fastening piece that is to be rotated in the actual application. Needless to say, the socket 4, can be removed from the core 2 by removing the screw 4s and replaced with an alternate type of socket when necessary.

Next, the function of the above described socket mechanism 100 will be explained in reference to FIGS. 3 and 4.

Figure 3:
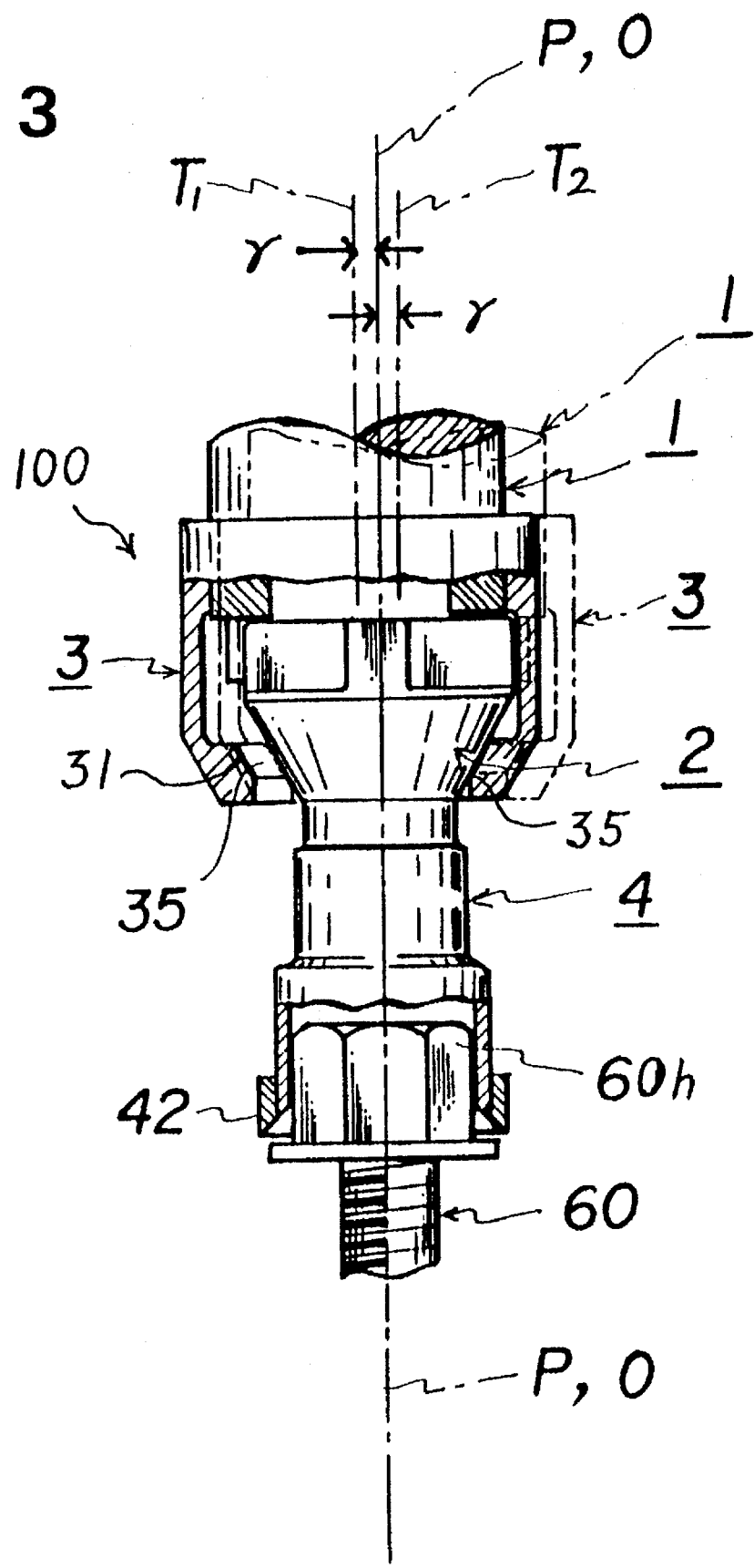
FIGS. 3 and 4 are partially cut-off elevational side views of the socket mechanism and the bolt shown in FIG. 1, for the purpose of showing particularly the functions of the mechanism.
Figure 4:
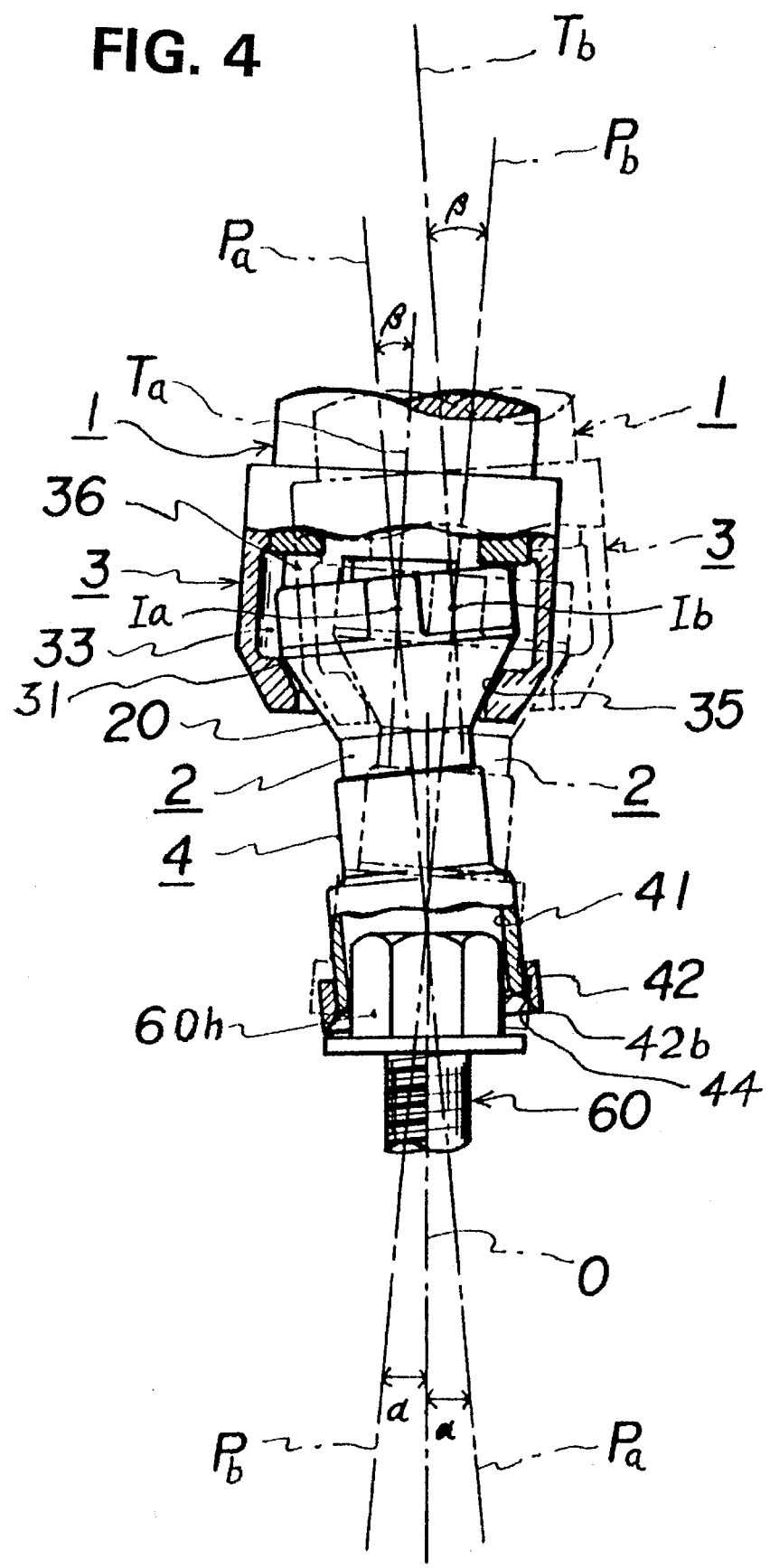
Figure 5:
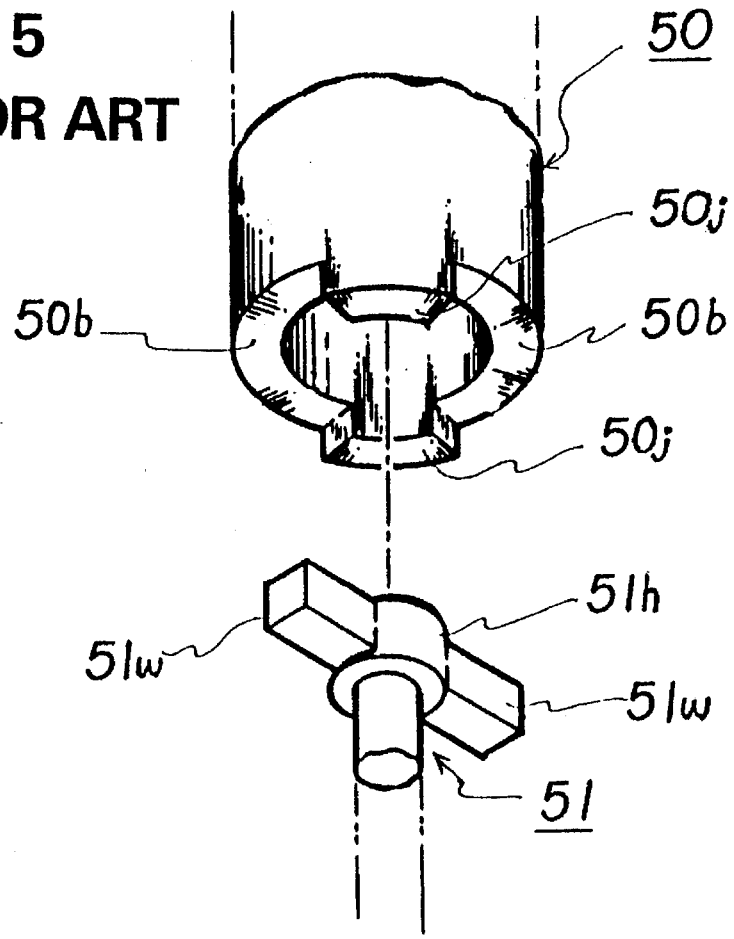
FIG. 5 is a perspective partial view of a combination of a conventional flexible-coupling type socket and a bolt.
Figure 6:
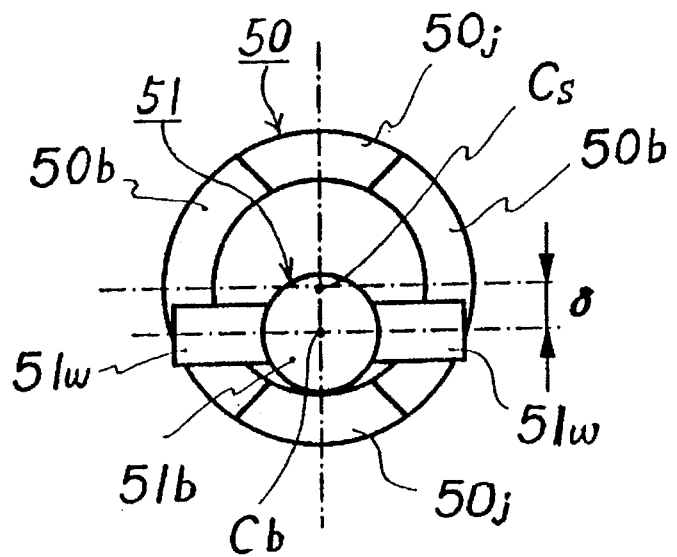
FIG. 6 is a diagrammatic under view particularly showing horizontal relative positions of the socket and the bolt shown in FIG. 5.

FIGS. 3 and 4 are partially cut-off elevational side views of the socket mechanism 100, for the purpose of explaining particularly the function of the socket mechanism 100.

The drive shaft 10 of the driving apparatus may not always be positioned in a manner that the drive shaft 10 is laterally exactly aligned with the bolt 60 to be rotated. Provided that the spindle 1 is coupled with the vertical drive shaft 10 angularly aligned and the core 2 and the socket 4 are vertically positioned, and if the drive shaft 10 is not laterally aligned with the bolt 60, the core 2 and the core holder 3 may not be laterally aligned with the bolt 60 either.

FIG. 3 shows a state of the socket mechanism 100 in that the core holder 3 is laterally shifted with respect to the core 2 to the mechanical limit. In FIG. 3, "P" denotes the center axis of the socket holding core 2 and the socket 4. "O" denotes the center axis of the bolt 60 to be driven. In this case, as illustrated in FIG. 3, the axis P coincides with the axis O. "T1" denotes a center axis of the spindle 1 and the core holder 3 that are connected to the vertical drive shaft of the driving apparatus (not shown) when the core holder 3 is laterally shifted to the left (as viewed in FIG. 3) to the mechanically allowable limit with respect to the position of the core 2. In this state, the drive shaft of the driving apparatus is laterally misaligned with the bolt 60 by dimension "γ". "T2" denotes a center axis of the spindle 1 and the core holder 3 when the core holder 3 is laterally shifted to the right (as viewed in FIG. 3) to the mechanically allowable limit with respect to the position of the core 2. In this state, the drive shaft of the driving apparatus is also laterally misaligned with the bolt 60 by dimension "γ". The lateral misalignment between the core 2 and the core holder 3 is made possible because of the flexible coupling therebetween and the presence of the space in the core holder 3 within which the upper part of the core 2 can be freely moved and the core 2 can slide up or down on the chamfered rim 35 of the bottom opening, 31 of the core holder 3. Namely, provided that all of the drive shaft, the spindle 1, the core holder 3, the core 2, the socket 4 and the bolt 60 are positioned vertically, as long as the amount of the lateral misalignment between the drive shaft and the bolt 60 is within the dimension γ, the rotational power can still be transmitted from the drive shaft to the bolt 60 through the socket mechanism 100.

The spindle 1 may be coupled to the drive shaft 10 of the powered driving apparatus a little loosely. In that case, the spindle 1 and the core holder 3 are allowed to angle with respect to the drive shaft 10, which is always vertical, and tilt from the vertical position.

In FIG. 4, the bolt 60 and the center axis O thereof are illustrated in vertical position. "Pa" denotes a common center axis of the socket holding core 2 and the socket 4 when the core 2 and the socket 4 are tilted from the vertical position at angle α as the spindle 1 and the core holder 3 are tilted in one direction as illustrated in solid lines in FIG. 4. In this case, the spindle 1 and the core holder 3 have a tilted common center axis "Ta" which is angled at "β" with respect to the axis Pa. "Pb" denotes a common center axis of the core 2 and the socket 4 when the core 2 and the socket 4 are tilted from the vertical position at angle α in the other direction as illustrated in ghost lines in FIG. 4. In this case, the spindle 1 and the core holder 3 have a tilted common center axis "Tb" which is angled at "β" with respect to the axis Pb.

"Ia" denotes a geometric intersecting point between the axis Ta and the axis Pa. "Ib" denotes a geometric intersecting point between the axis Tb and the axis Pb. Each of the points Ia and Ib can be regarded as a geometric center of the coupling between the core 2 and the core holder 3. Provided that the positions of the drive shaft and the bolt 60 are laterally fixed, as the drive shaft is rotated, the socket mechanism 100 in a folded state will rotate but will also make a circular motion in a manner that the intersecting point of the axes, or the geometric center of the coupling, between the core 2 and the core holder 3 will make generally a horizontally circular locus including the points Ia and Ib.

In reference to FIGS. 1 to 4, the socket mechanism 100 is lowered toward the object bolt 60 (or nut) to be engaged as the drive shaft 10 of the vertical-type powered bolt/nut driving apparatus (not shown) is lowered. If the socket 4 and the bolt 60 are laterally aligned with each other, the socket 4 will engage with the bolthead 60h vertically. When the socket 4 is laterally misaligned with the bolt 60, but if the top of the bolthead 60h comes within the bottom end rim 42b of the guide ring 42 of the socket 4, the bolthead 60h will first touch the ring 42 of the socket 4 on one side of the slant guiding surface 44 thereof. Then, the core 2 and the socket 4 will tilt at an angle with respect to the vertical axis O of the bolt 60, but the bolthead 60h will slip into the socket 4 while being guided by the slant guiding surface 44 of the socket 4. At this time, the entire body of the core 2 and the socket 4 is allowed to tilt because of the fact that the core 2 is freely lying on the rim 35 of the bottom opening 31 of the core holder 3 and the presence of the vertical gaps 36 and the horizontal gaps 33 between the core 2 and the spindle 1 or the core holder 3.

In this state, the spindle 1 and the core holder 3 are rotated by the drive shaft 10 of the powered bolt/nut driving apparatus. Then, the lugs 12 of the spindle 1 will rotatingly engage with the engaging ridges 23 of the core 2, and the rotational power of the spindle 1 will be transmitted to the core 2. At this time, the core 2 and the socket 4 will rotate while having angular misalignment of β with the spindle 1 and the core holder 3, and the tilting angle α with respect to the vertical axis O of the bolt 60. Namely, the entire body of the core 2 and the socket 4 makes a rotational motion similar to the motion made by a rotating top.

As described above, using the socket mechanism 100 of the present invention, readily available bolts or nuts can be rotated by a conventional vertical type bolt/nut driving apparatus even if a reasonable amount of lateral misalignment is present between the object bolt or nut and the drive shaft of the driving apparatus.

It will be understood that various changes and modifications may be made in the above described embodiments which provide the characteristics of the present invention without departing from the spirit and principle thereof particularly as defined in the following claims.

What is claimed is:

1. A socket mechanism having a flexible coupling therein for rotating an object fastening piece that is used with a vertical type powered driving apparatus, comprising:

(a) a spindle that can be removably connected to a vertical drive shaft of the driving apparatus so as to be vertically moved and rotated by the driving apparatus, said spindle having at least one downwardly protecting lug in a bottom end thereof;

(b) a core holder that is connected to said spindle, said core holder having an opening having a rim whose geometric center is in a rotating axis of said core holder;

(c) a socket holding core having a downwardly tapered mid section, said core freely lying on said rim of said opening of said core holder in said downwardly tapered mid section thereof in a manner that a first part of said core is above said opening and a second part of said core is below said opening and suspending from said core holder, said core having at least one upwardly protecting ridge in a top section thereof in a manner that said spindle and said core engage by way of said lug and said ridge and that said top section of said core is vertically and laterally moveable within said core holder; and (d) a socket for engaging with the object fastening piece to be rotated, said socket being removably connected to said socket holding core in a manner that a rotating power is transmitted from said socket holding core to said socket.

2. A socket mechanism having a flexible coupling therein for rotating an object fastening piece that is used with a vertical type powered driving apparatus, comprising:

(a) a spindle that can be removably connected to a vertical drive shaft of the driving apparatus so as to be vertically moved and rotated by the driving apparatus, said spindle having at least one downwardly projecting lug in a bottom end thereof;

(b) a generally cylindrically-shaped core holder that is fixedly and coaxially connected to said spindle so that said core holder is rotated as said spindle is rotated, said core holder having a circular bottom opening having a chamfered rim whose geometric center is in a common rotating axis of said spindle and said core holder;

(c) a socket holding core having a downwardly tapered mid section, said core freely lying on said rim of said bottom opening of said core holder in said downwardly tapered mid section thereof in a manner that a first part of said core is above said bottom opening, within said core holder, and movable therein within predetermined vertical and lateral limits, a second part of said core is below said opening and suspending from said core holder, and said core is tiltable with respect to said core holder, said core having at least one upwardly projecting ridge in said top section thereof in a manner that when said spindle is rotated said downwardly projecting lug thereof engages with said upwardly projecting ridge of said core so that a rotating power is transmitted from said spindle to said core; and (d) a socket for engaging with the object fastening piece to be rotated, said socket being fixedly connected to said second part of said core coaxially therewith.

3. A socket mechanism according to claim 2, wherein said socket has a guide ring in a bottom section thereof for guiding the fastening piece thereinto.

4. A socket mechanism according to claim 3, wherein said guide ring of said socket has a downwardly widening slant inside surface.

\* \* \* \* \*